US011616267B2

(12) United States Patent
Thurmeier et al.

(10) Patent No.: US 11,616,267 B2
(45) Date of Patent: Mar. 28, 2023

(54) MODULAR SYSTEM FOR TRACTION BATTERIES OF MOTOR VEHICLES

(71) Applicant: AUDI AG, Ingolstadt (DE)

(72) Inventors: Markus Thurmeier, Adlkofen (DE); Bernd Mlekusch, Sankt Veit/Glan (AT)

(73) Assignee: AUDI AG, Ingolstadt (DE)

( * ) Notice: Subject to any disclaimer, the term of this patent is extended or adjusted under 35 U.S.C. 154(b) by 339 days.

(21) Appl. No.: 16/488,314

(22) PCT Filed: Jan. 23, 2018

(86) PCT No.: PCT/EP2018/051607
§ 371 (c)(1),
(2) Date: Aug. 23, 2019

(87) PCT Pub. No.: WO2018/158008
PCT Pub. Date: Sep. 7, 2018

(65) Prior Publication Data
US 2019/0379008 A1      Dec. 12, 2019

(30) Foreign Application Priority Data

Mar. 1, 2017  (DE) .................... 10 2017 203 321.5

(51) Int. Cl.
| H01M 50/258 | (2021.01) |
| H01M 10/613 | (2014.01) |
| H01M 10/625 | (2014.01) |
| H01M 10/6561 | (2014.01) |
| H01M 10/6568 | (2014.01) |
| H01M 10/48 | (2006.01) |
| H01M 50/24 | (2021.01) |
| H01M 50/271 | (2021.01) |
| H01M 50/103 | (2021.01) |
| H01M 50/209 | (2021.01) |

(52) U.S. Cl.
CPC ......... *H01M 50/258* (2021.01); *H01M 10/48* (2013.01); *H01M 10/613* (2015.04); *H01M 10/625* (2015.04); *H01M 10/6561* (2015.04); *H01M 10/6568* (2015.04); *H01M 50/24* (2021.01); *H01M 50/271* (2021.01); *H01M 50/103* (2021.01); *H01M 50/209* (2021.01); *H01M 2220/20* (2013.01)

(58) Field of Classification Search
CPC .... H01M 50/258; H01M 50/20; H01M 50/24; H01M 10/613; H01M 10/625; H01M 10/6561; H01M 10/6568
See application file for complete search history.

(56) References Cited

U.S. PATENT DOCUMENTS

| 9,016,765 B1* | 4/2015 | Rawlinson | B60L 50/66 296/187.07 |
| 2002/0102457 A1* | 8/2002 | Oogami | H01M 50/502 429/159 |
| 2007/0141457 A1* | 6/2007 | Amagai | H01M 10/48 429/162 |
| 2010/0175375 A1* | 7/2010 | Gilch | F02C 9/20 251/129.01 |
| 2013/0069431 A1* | 3/2013 | Tseng | H02J 7/342 307/43 |
| 2013/0164593 A1* | 6/2013 | Burrows | B60K 1/04 429/120 |
| 2014/0154602 A1* | 6/2014 | Michelitsch | H01M 8/0258 429/432 |
| 2014/0272515 A1 | 9/2014 | Maguire et al. | |
| 2015/0194714 A1* | 7/2015 | You | H01M 10/6569 429/120 |
| 2015/0375623 A1* | 12/2015 | Galamb | B60L 50/64 180/65.31 |
| 2016/0064703 A1* | 3/2016 | Mack | H01M 50/224 156/272.8 |

FOREIGN PATENT DOCUMENTS

| CA | 2 860 465 | * | 7/2013 |
| CN | 101326657 | A | 12/2008 |
| CN | 101830161 | A | 9/2010 |
| CN | 102381173 | A | 3/2012 |
| CN | 103155209 | A | 6/2013 |
| CN | 103178223 | A | 6/2013 |
| CN | 103314478 | A | 9/2013 |
| CN | 103474593 | A | 12/2013 |
| CN | 103518273 | A | 1/2014 |
| CN | 103702893 | A | 4/2014 |
| CN | 104051815 | A | 9/2014 |
| CN | 104247083 | A | 12/2014 |
| CN | 104332566 | A | 2/2015 |
| CN | 104868073 | A | 8/2015 |
| CN | 204895705 | U | 12/2015 |
| CN | 105313659 | A | 2/2016 |
| CN | 105469997 | A | 4/2016 |
| CN | 205159386 | U | 4/2016 |
| CN | 105857045 | A | 8/2016 |
| CN | 205666266 | U | 10/2016 |
| CN | 106099242 | A | 11/2016 |
| CN | 106450073 | A | 2/2017 |
| DE | 102009043635 | A1 | 4/2011 |
| DE | 102010025656 | A1 | 1/2012 |
| DE | 102011101352 | A1 | 11/2012 |
| DE | 102011051698 | A1 | 1/2013 |

(Continued)

OTHER PUBLICATIONS

JP 2008004508 Google English Machine Translation printed Oct. 3, 2021.*

(Continued)

*Primary Examiner* — Anca Eoff
(74) *Attorney, Agent, or Firm* — Maier & Maier, PLLC

(57) ABSTRACT

A modular system for traction batteries of motor vehicles, having multiple battery modules includes respective battery cells, which can be electrically connected to one another in modular manner to produce different variants of traction batteries, wherein the battery modules each have a modular housing, in which the respective battery cells are arranged in fluid-tight manner; the battery modules each have a mechanical interface by means of which the battery modules can be attached to an underside of a motor vehicle.

9 Claims, 6 Drawing Sheets

(56) References Cited

FOREIGN PATENT DOCUMENTS

| | | | | |
|---|---|---|---|---|
| DE | 102011052515 | * | 2/2013 | ............ H01M 2/02 |
| DE | 102011052515 A1 | | 2/2013 | |
| DE | 102012223030 A1 | | 6/2013 | |
| DE | 102012223144 A1 | | 6/2013 | |
| DE | 102014215032 A1 | | 2/2016 | |
| DE | 102015223368 A1 | | 2/2017 | |
| JP | 2008-004508 | * | 1/2000 | ............ Y02E 60/10 |
| JP | 2001-266825 A | | 9/2001 | |
| WO | 2011026984 A1 | | 3/2011 | |
| WO | 2016/045752 A1 | | 3/2016 | |
| WO | 2016/146044 A1 | | 9/2016 | |
| WO | 2017/139444 A1 | | 8/2017 | |

OTHER PUBLICATIONS

DE 102011052515 Google English Machine Translation printed Oct. 3, 2021.*

Kyung Geun Pak [Pak] (Destructive disassembly of bolts and screws using impact Digital Commons @ NJIT, May 31, 2002).*

Notification of Transmittal of Translation of the International Preliminary Report on Patentability dated Sep. 12, 2019, in connection with corresponding International Application No. PCT/EP2018/051607 (9 pgs.).

Chinese Office Action dated Aug. 19, 2021, in connection with corresponding CN Application No. 201880014954.4 (19 pp., including machine-generated English translation).

German Examination Report dated Dec. 12, 2017 in corresponding German Application No. 10 2017 203 321.5; 20 pages.

International Search Report and Written Opinion dated May 11, 2018 in corresponding International Application No. PCT/EP2018/051607; 25 pages.

Second Chinese Office Action dated Jan. 10, 2022, in connection with corresponding Chinese Application No. 201880014954.4; 11 pages (machine generated English translation).

* cited by examiner

MODULAR SYSTEM FOR TRACTION BATTERIES OF MOTOR VEHICLES

CROSS-REFERENCE TO RELATED APPLICATIONS

The instant application is a National Stage entry under 35 U.S.C. 371 of PCT/EP2018/051607 filed on Jan. 23, 2018, which claims priority to application No. 10-2017-203 321.5 filed on Mar. 1, 2017, in Germany, the entire contents of which are hereby incorporated by reference.

FIELD

The invention relates to a modular system for traction batteries of motor vehicles of the kind. Furthermore, the invention relates to a motor vehicle with multiple battery modules of such a modular system.

BACKGROUND

It is known in itself how to assemble multiple battery cells to form battery modules. An assemblage of battery cells to form individual battery modules is shown for example in DE 10 2012 223 144 A1.

Furthermore, it is also already known how to provide a kind of modular system for traction batteries of motor vehicles, where such modular systems comprise multiple battery modules having respective battery cells, which can be electrically interconnected in modular manner to form different variants of traction batteries. Such a modular system is shown for example in DE 10 2011 101 352 A1. The individual battery modules may be plugged in on a common circuit board. By varying the arrangement and the number of battery modules plugged into the circuit board, different variants of traction batteries can be produced.

Traction batteries are usually enclosed by means of a housing. Often such housings are also made as a single piece. Such a construction rules out many production methods, such as aluminum diecasting, injection molding, or the like, since such housings are too large for such fabrication methods, at least for a cost effective production. Consequently, methods of producing such housings for traction batteries are often used only for small series production. Furthermore, such large housings to enclose the traction batteries often present drawbacks in their sealing. Due to the large dimensions of such housings, the tolerance chain is often unfavorable, so that such housings can only be sealed with difficulty. Furthermore, the connecting of traction batteries, which are housed entirely by means of a common housing, is relatively inflexible and difficult, since the installation area for the traction batteries in motor vehicles is often relatively uneven.

SUMMARY

The problem which embodiments of the present invention proposes to solve is to provide a modular system for traction batteries of motor vehicles, making possible an especially flexible outfitting of a motor vehicle with battery modules in an especially simple manner.

This problem may be solved by a modular system for traction batteries of motor vehicles. Advantageous embodiments with feasible and nontrivial modifications of the invention are indicated in the disclosure.

The modular system according to the invention for traction batteries of motor vehicles comprises multiple battery modules having respective battery cells, which can be electrically connected to one another in modular manner to produce different variants of traction batteries. The modular system according to the invention is characterized in that the battery modules each have a modular housing, in which the respective battery cells are arranged in fluid-tight manner. Moreover, the modular system according to the invention is characterized in that the battery modules each have a mechanical interface by means of which the battery modules can be attached to an underside of a motor vehicle.

One important aspect of the invention is that the battery modules each have their own modular housing, which encloses the respective battery cells of the battery modules in fluid-tight manner. The entire inner workings of the battery modules are thus enclosed in fluid-tight manner and thus sealed off by the modular housing. Using the mechanical interfaces of the battery modules, these can be directly attached to an underside of a motor vehicle. Since the modules are already reliably sealed off by their modular housing, no additional housing needs to be provided to house the traction battery formed from the modules.

The individual battery modules may be flexibly arranged and electrically interconnected in the underbody are of the motor vehicle, forming a suitable traction battery by the interconnected battery modules.

Since the battery modules can be installed separately on the motor vehicle and also can be dismounted once more, the battery modules can also be used without problem for other applications. For example, the battery modules can be dismounted from a motor vehicle to be used as accumulators for a photovoltaic system. Furthermore, tightness requirements are no longer placed on the overall housing of a traction battery, since the battery modules are all tight in themselves, because the modular housing encloses the entire inner workings of the battery modules in fluid-tight manner.

One advantageous embodiment of the invention calls for the modular housing to comprise integrated cooling ducts and at least one coolant port for a coolant for cooling the battery cells. The cooling may thus occur separately for each battery module. Preferably, the modular system comprises coolant lines with plug connections which are compatible with the coolant ports of the battery modules. The individual battery modules may thus be connected separately to one of the coolant lines of the modular system. A reliable cooling of the individual battery cells of the battery modules may be thereby assured.

A further advantageous embodiment of the invention calls for the battery modules to have respective data interfaces for the monitoring of at least one operating parameter of the battery cells. The battery modules for example may each comprise a data port, by means of which the most diverse parameters of the battery modules can be interrogated and monitored. Thus, for example, information as to the state of the individual battery cells may also be obtained continuously. Corresponding sensors for the monitoring of the battery cells may be installed in the battery modules themselves.

In a further advantageous embodiment of the invention it is provided that the battery modules comprise respective connection sites by means of which the battery modules can be electrically coupled to each other at least indirectly. On the one hand, it may be provided that the battery modules can be electrically coupled to each other directly by the respective connection sites. Alternatively, however, it is also possible for the modular system to have a kind of central interface in the form of a high-voltage center, at which the individual battery modules can be contacted. Depending on which degree of modularity is required with regard to the assemblage of the battery modules to form different variants of traction batteries, it may be provided that the battery modules can be electrically connected to each other directly, while it is also equally possible for the mentioned central interface to be provided on the vehicle side, to which the individual battery modules can be coupled.

According to a further advantageous embodiment of the invention it is provided that the battery modules can be fastened by means of their mechanical interfaces to the underside of a motor vehicle in such a way that the battery modules are movable relative to the motor vehicle, starting from a given exerted force, in the direction of the exerted force. For example, a kind of rail system can be provided, on which the battery modules can be fastened at the vehicle side. In this way, especially in event of a crash, such as a side impact, it is possible for the battery modules to still avoid the stress loading for a bit. The crash performance of the battery modules is improved, since the battery modules can be attached individually to the motor vehicle. If the battery modules can still avoid the exerted force for a bit, a deformation of the battery modules in event of a crash can be prevented for a bit.

A further advantageous embodiment of the invention calls for the modular housing to have a housing shell and two housing covers. The housing shell is preferably formed as an extruded part, while the housing covers may be injection molded parts. The extruded part by virtue of its metallic parts can provide a requisite electromagnetic compatibility of the respective battery modules. The housing covers formed as injection molded parts bring the advantage that many functionalities, such as the coolant ports and the like, can be integrated directly in the housing covers during their fabrication.

The motor vehicle according to the invention comprises multiple battery modules of the modular system according to the invention or an advantageous embodiment of the modular system according to the invention, wherein the battery modules are fastened by their mechanical interfaces to an underside of the motor vehicle.

Further advantages, features and details of the invention will emerge from the following description of a preferred exemplary embodiment and with the aid of the drawings. The features and combinations of features mentioned above in the description as well as the features and combinations of features mentioned below in the description of the figures and/or illustrated in the figures alone may be used not only in the indicated combination, but also in other combinations or standing alone, without leaving the scope of the invention.

DETAILED DESCRIPTION

Figure 1:
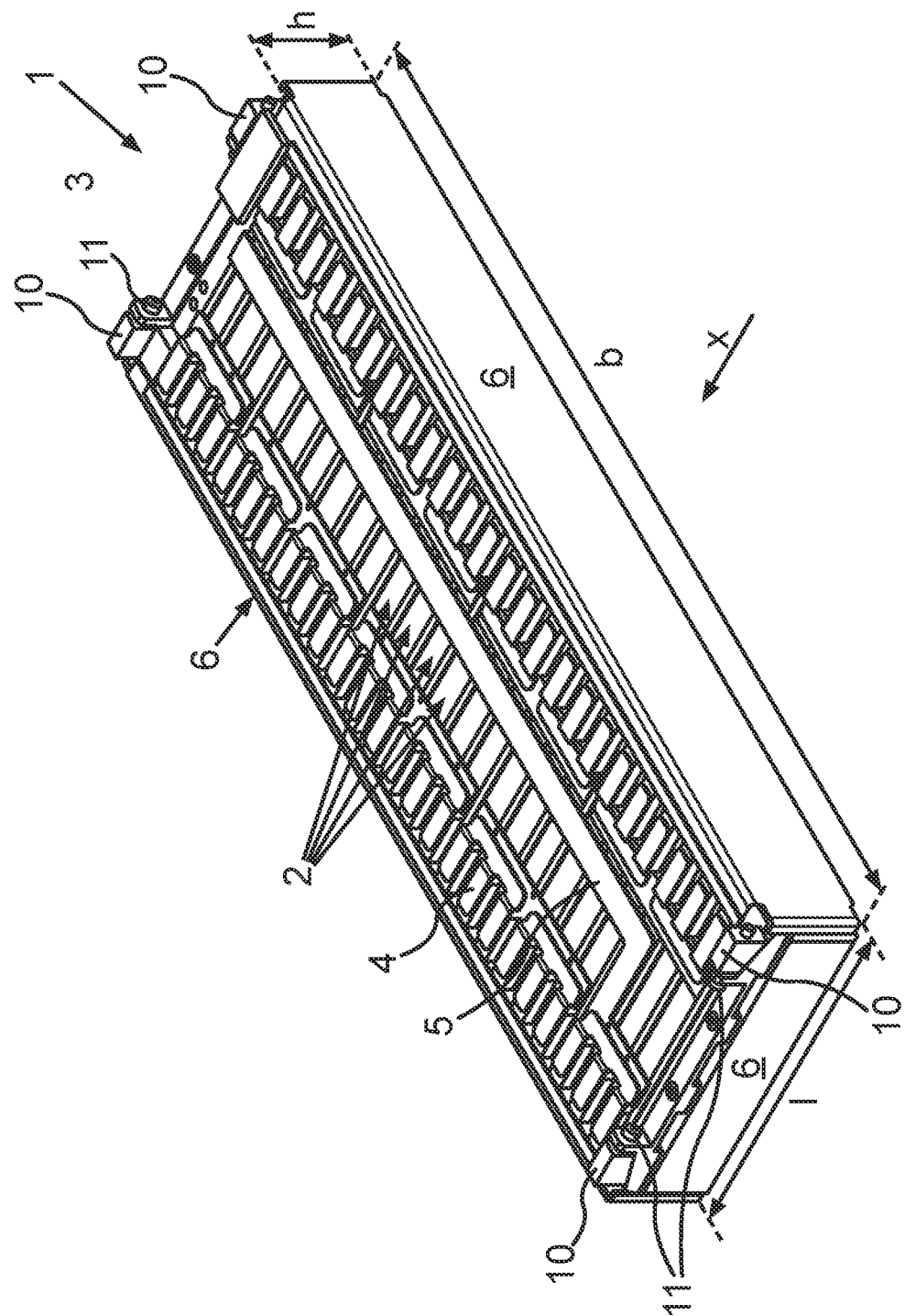
FIG. 1 a perspective view of a battery module, where a modular housing of the battery module has been left out to free up the view of individual battery cells of the battery module.

A battery module 1 is shown in a perspective view in FIG. 1. A modular housing enclosing the battery module 1 in itself has been left out of the present representation, so that there is a clear view of the respective prismatic battery cells 2. The battery module 1 has connection sites 3, by means of which the battery module 1 can be electrically connected directly or at least indirectly to further battery modules. The battery cells 2 are connected together to each other by individual contacting plates 4, which are connected to a cell connector 5.

A compound holding frame 6 encloses the battery cells 2. The holding frame 6 ensures that the battery cells 2 cannot expand in undesirable manner during the operation of the battery module 1, i.e., during the discharging of the battery cells 2 or during the charging of the battery cells 2. A preferred direction of installation of the battery module 1 is indicated by the longitudinal direction of a motor vehicle, not shown here, marked by the arrow x. The battery module 1 shown here has a length l of 210.5 mm, a width b of 631.5 mm and a height h of 73 mm. These figures pertain to the dimensions of the battery module 1 without the mentioned modular housing, which is not shown in the present representation. The mentioned figures are merely to be taken as an example; of course, other dimensions are also likewise possible.

Figure 2:
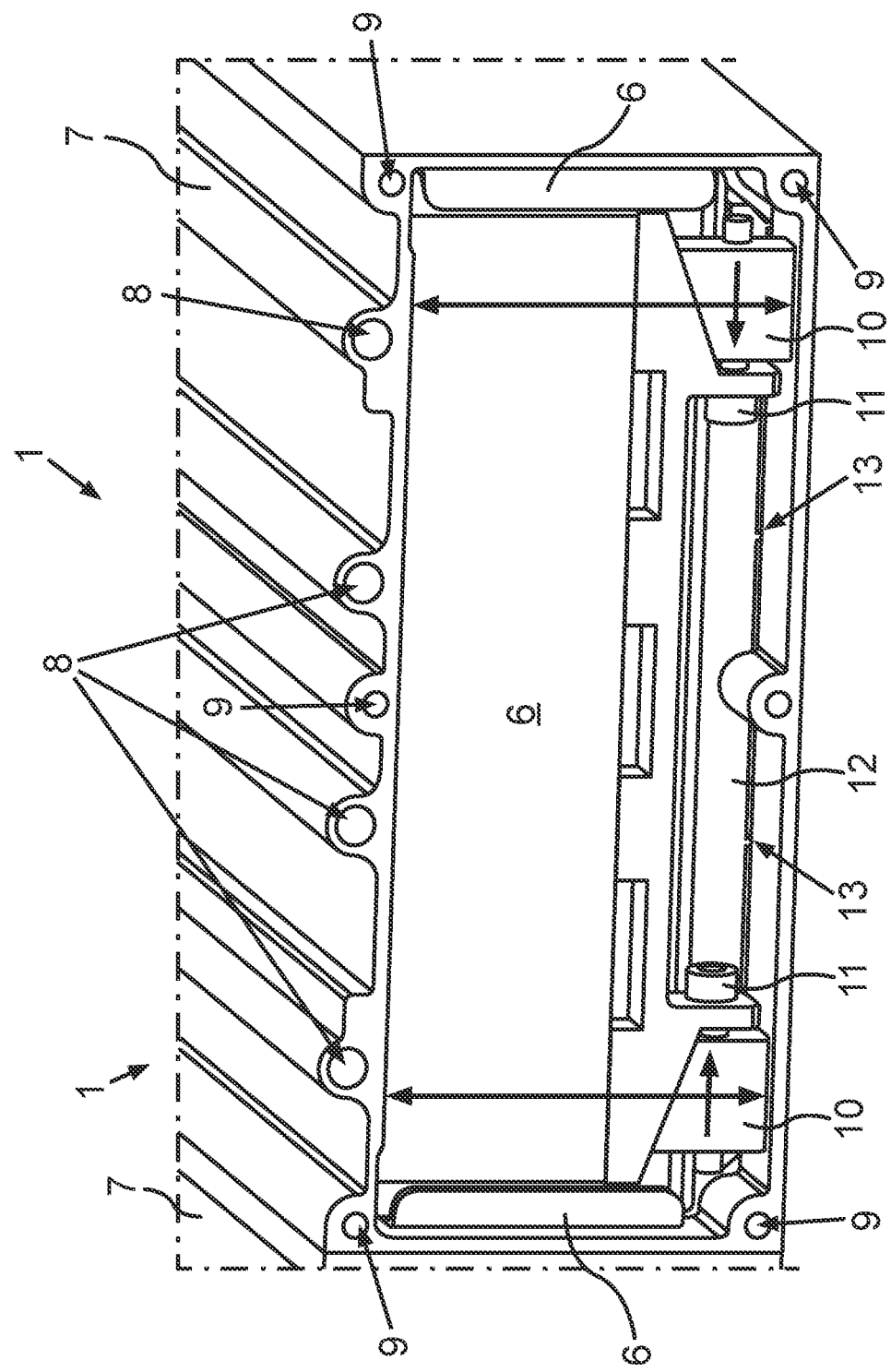
FIG. 2 an end-face perspective detail view of an end face of the battery module, representing a housing shell, which is part of the modular housing, in which the individual battery cells are received.

FIG. 2 shows the battery module 1 in a partly represented perspective view shown from the front. In the present representation, the battery cells 2 are surrounded by a housing shell 7, which is part of said modular housing. The housing shell 7 may be an extruded piece, for example. In order to enable a reliable cooling of the individual battery cells 2, the housing shell 7 has a plurality of integrated cooling ducts 8. Furthermore, the housing shell 7 also has a whole series of boreholes 9, which serve to attach a housing cover, not yet represented here, on the housing shell 7.

The battery module 1 comprises multiple chocks 10, which can be tightened by means of screws 11. The chocks 10 serve for reliably securing the inner part of the battery module 1, i.e., the interconnected battery cells 2 among others, within the housing shell 7.

Moreover, the battery module 1 further comprises a cover 12, having multiple runners 13. By means of the cover and its runners 13, the interconnected battery cells 2 can be shoved especially easily into the housing shell 7 and then be secured in the housing shell 7 by tightening the screws 11 with the aid of the chocks 10.

Figure 3:
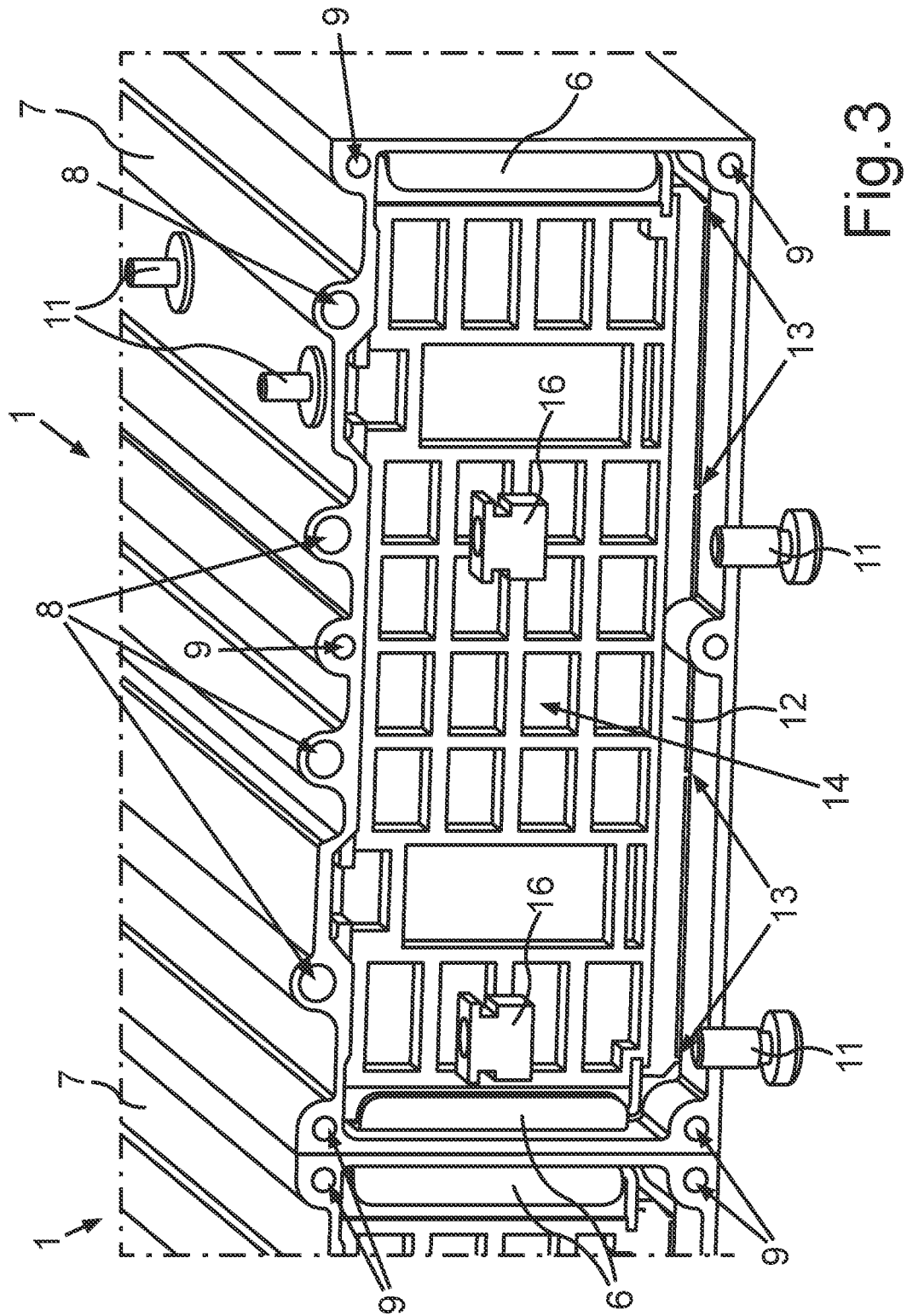
FIG. 3 an end-face perspective view of two partly represented battery modules, showing respective housing shells of the battery modules, having multiple boreholes and coolant ducts.

FIG. 3 shows in addition to the one battery module 1 also in part another battery module 1. According to the present representation, the respective housing shells 7 are arranged next to each other on a common lengthwise side. A kind of end-face cover 14 has also been installed in the housing shell 7. Moreover, a plurality of screws 11 are shown, by means of which the end-face cover 14 can be secured to the housing shell 7, among other things.

For the securing of the end-face cover 14 to the housing shell 7, the respective endface covers 14 have recesses 15 in which respective sliding blocks 16 can be received. The sliding blocks 16 have boreholes, not otherwise indicated, in which the screws 11 can be installed. In this way, the end-face covers 14 can be firmly and reliably connected to the housing shell 7.

Figure 4:
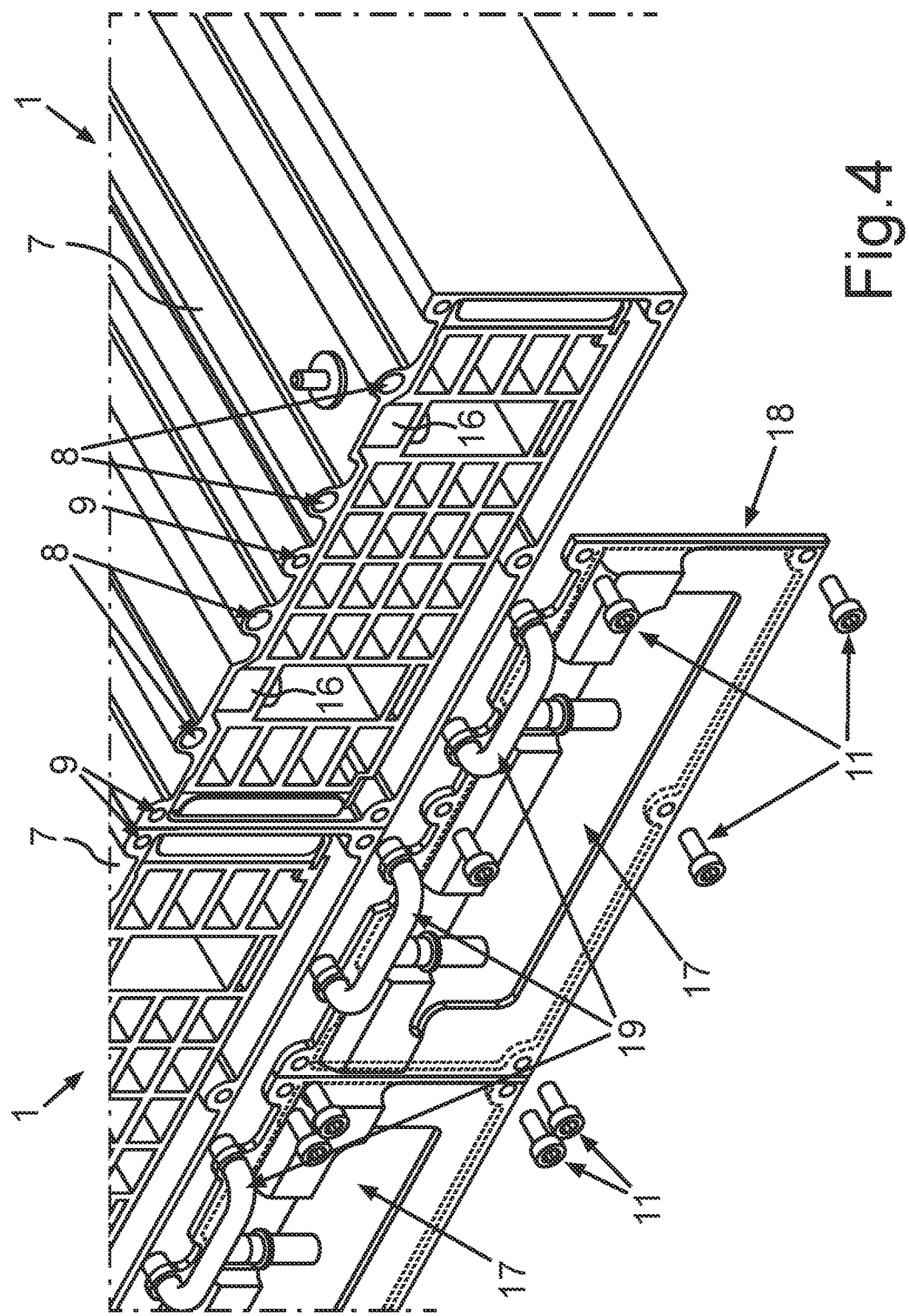
FIG. 4 a perspective detail view of the two partly represented battery modules, showing in addition respective housing covers in which multiple cooling water nipples are integrated.

FIG. 4 shows once again the two battery modules 1, but now in addition respective housing covers 7 are represented, which form together with the housing shells 7 the mentioned modular housings in which the battery cells 2 of the battery modules 1 are arranged in fluid-tight manner. In the present representation, the housing covers 17 are shown partly transparent. The housing covers 17 have seals 18 all around. The housing covers 17 for example can be produced by two-component injection molding, wherein a first plastic component forms the actual housing cover 17 and a second plastic component forms the seal 18. Furthermore, each time two cooling water nipples 19 are molded onto the housing covers 17. The cooling water nipples 19 can be connected to the cooling ducts 8 of the housing shell 7. Respective O-ring seals 20 are provided at the cooling water nipples 19. In this way, it can be assured that the cooling water nipples 19 can be connected especially tightly to the cooling ducts 8.

Figure 5:
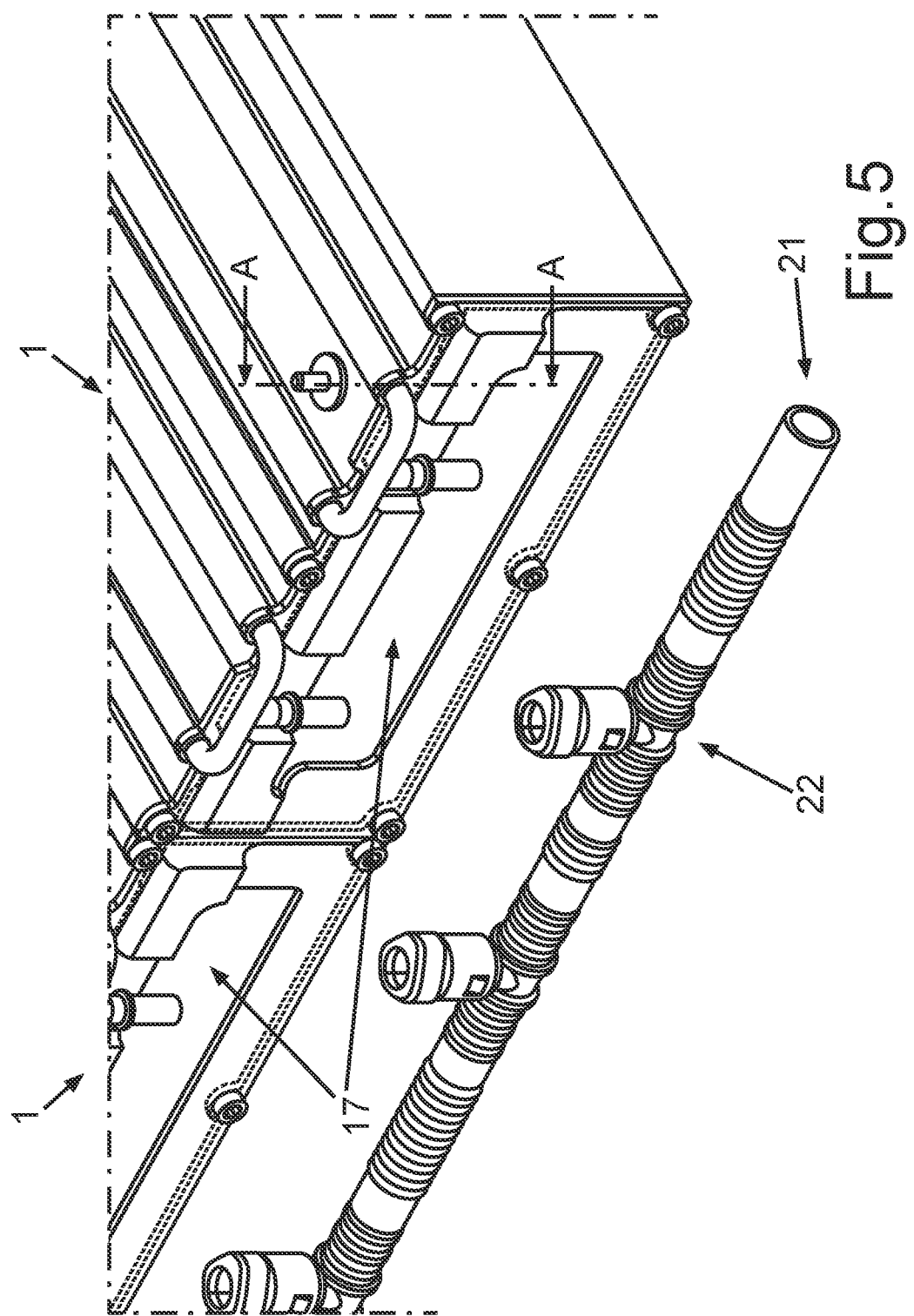
FIG. 5 a perspective detail view of the two partly represented battery modules, showing in addition a coolant line to which the cooling water nipples can be connected.

FIG. 5 shows the two battery modules 1 once again in partial representation, but now the housing covers 17 have been screwed onto the respective housing shells 7. In the present instance, the housing covers 17 are now no longer shown as partly transparent. Once the housing covers 17 have been screwed firmly to the housing shell 7, the housing shell 7 and the housing covers 17 reliably seal off the inner workings of the battery modules 1 in fluid-tight manner.

A coolant line 21 with multiple couplings 22 can be connected by its couplings 22 to the respective cooling water nipples 19. In this way, the individual battery modules 1, or rather the housing shell 7, can be connected to a cooling circuit. The coolant line 21 is at least partly corrugated, so that it is especially flexible. This facilitates the mounting of the coolant line 21 on the cooling water nipples 19, on the one hand, and on the other hand any expansions occurring during operation can thus be easily compensated.

Figure 6:
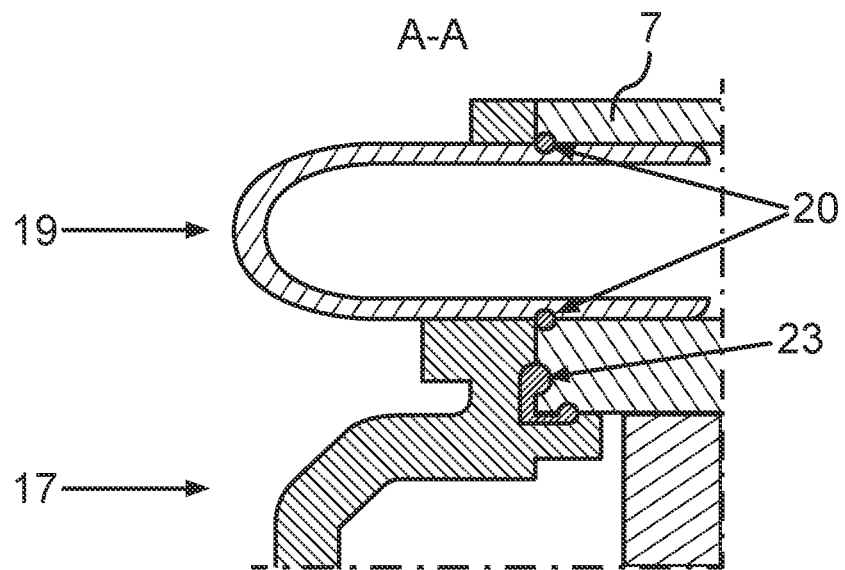
FIG. 6 a lateral sectional view along sectioning plane A-A indicated in FIG. 5, through one of the two battery modules.

FIG. 6 shows one of the two battery modules 1 along the sectioning plane A-A indicated in FIG. 5. In the present representation, the arrangement of one of the cooling water nipples 19 on the housing cover 17 and on the housing shell 7 is once again clearly seen. Besides one of the already mentioned O-ring seals 20, yet other seals 23 are provided, by means of which it is assured that the housing covers 17 can be connected fluid-tight to the housing shell 7.

Figure 7:
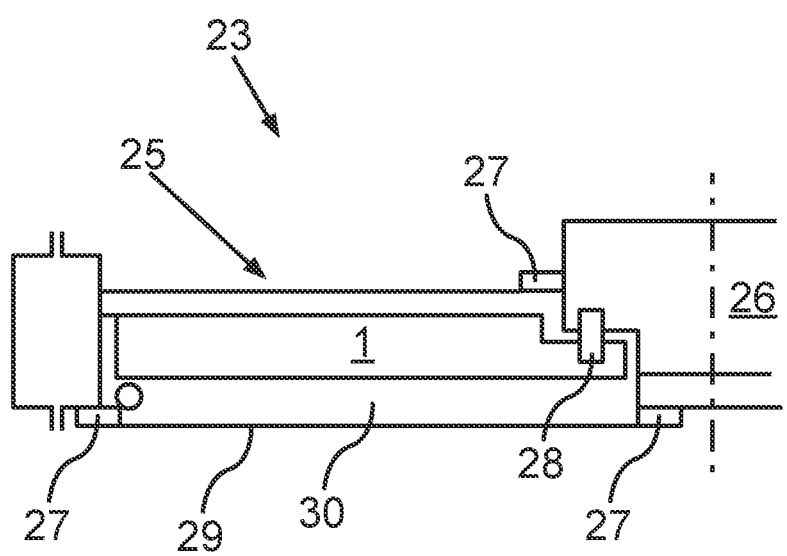
FIG. 7 a highly schematized view in which the fastening of one of the battery modules in the region of an underbody of a motor vehicle and at a central interface is shown.

FIG. 7 shows quite schematically a detail of a motor vehicle 24 in the area of an underbody 25 of the motor vehicle 24. One of the battery modules 1 is shown schematically, being connected to a kind of central interface 26. Furthermore, yet other seals 27 are provided, which can optionally further seal off the battery module 1 from the outside. By a schematically represented plug 28, the battery module 1 is electrically connected to the central interface 26. The plug 28 can be contacted at the connection site 3 represented in FIG. 1, so as to produce an electrical coupling of the battery module 1 to the central interface 26.

The central interface 26 may extend for example in the vehicle lengthwise direction in the area of the underbody 25. At the left and at the right of this central interface 26, further battery modules 1 not represented here can be arranged and contacted.

This central interface 26 accommodates not otherwise represented high-voltage lines and circuitry which is especially well protected and arranged preferably in the middle of the motor vehicle 24.

The individual battery modules 1 can be screwed and/or plugged into the underbody 25. Since the battery modules 1 in themselves are already sealed off fluid-tight by their housing shell 7 and the housing covers 17, no further sealing of the battery modules 1 is required. The electrically interconnected battery modules 1 on the whole form a traction battery of the motor vehicle 24. The individual battery modules 1 can be interconnected in modular manner in different numbers and in different positionings.

The battery modules 1 furthermore comprise a mechanical interface, not represented here, by means of which the battery modules 1 can be fastened to the underside 25 of the motor vehicle 24. The battery modules 1 together form a modular system for traction batteries of motor vehicles. The individual battery modules 1, which are arranged on the underbody 25, can be arranged individually on the underbody 25 and also removed once more from the underbody 25. The battery modules 1 are substantially entirely independent in themselves, since they have a separate cooling and preferably also a data port, not otherwise shown here, by which the most diverse performance and/or operational parameters of the battery modules 1, especially their battery cells 2, can be interrogated and monitored. Furthermore, the battery modules 1 are each sufficiently shielded in terms of their electromagnetic compatibility.

After the battery modules 1 have been mounted on the underbody 25 of the motor vehicle 24, an underride protection 29 can be mounted in addition underneath the battery modules 1. This underride protection 29 in itself need not be completely tight, since the battery modules 1 in themselves are already sealed off in fluid-tight manner. Furthermore, a deformation space 30 may be left free between the underride protection 29 and the battery modules 1. Thus, if the motor vehicle 24 should touch down with the underride protection 29, for example, the battery modules 1 will not yet be deformed.

Furthermore, it may also be provided that the battery modules 1 can move somewhat in the vehicle transverse direction, contrary to the present representation, for example in event of a side impact. For this, the battery modules 1 may be anchored to the underbody 25 in such a way that they can move somewhat in the vehicle transverse direction when a certain force is applied to them. For this, a kind of deformation space can be provided in the vehicle transverse direction directly next to the battery modules 1, so that the battery modules 1 can move in the vehicle transverse direction. The advantage of this is that, during a side impact, the battery modules 1 are not directly deformed, since they can at first still move a bit in the vehicle transverse direction.

On the whole, the modular system comprising the battery modules 1 can provide an especially flexible and simple solution for combining the battery modules 1 in the most diverse combinations to form respective variants of traction batteries. Because the battery modules 1 in themselves are already fluid-tight in design, the traction battery assembled from the battery modules 1 does not need to be sealed off once more in costly manner.

The invention claimed is:

1. A modular system for traction batteries of a motor vehicle, comprising:

a plurality of battery modules, each of the plurality of battery modules comprising a modular housing in which a plurality of battery cells are arranged, wherein each of the plurality of battery modules are configured to be electrically connected to one another in modular manner to produce different variants of traction batteries, wherein each modular housing comprises a housing shell and two housing covers which cap either end of the housing shell, the housing shell and two housing covers thereby delimiting a fluid-tight chamber in which the plurality of battery cells are arranged, wherein each of the plurality of battery modules are independently attachable to an underside of the motor vehicle via a mechanical interface, wherein at least one of the two housing covers of each modular housing are provided with at least one coolant port for exchanging a coolant provided by a cooling system of the motor vehicle with a respective battery module, wherein the at least one coolant port is in fluidic communication with integrated cooling ducts formed in a wall of the housing shell for cooling the plurality of battery cells contained therein, such that the integrated cooling ducts are kept separate from the fluid-tight chamber, and wherein the housing shell is an extruded part into which the integrated cooling ducts are formed and the two housing covers are injection molded parts.

2. The modular system according to claim 1, wherein the cooling system of the motor vehicle comprises coolant lines which connect to the at least one coolant ports.

3. The modular system according to claim 1, wherein each of the plurality of battery modules further comprise at least one data interface for monitoring at least one operating parameter of the plurality of battery cells.

4. The modular system according to claim 1, wherein each of the plurality of battery modules further comprise a shield for electromagnetic compatibility.

5. The modular system according to claim 1, wherein each of the plurality of battery modules further comprise at least one connection site by which the plurality of battery modules are couplable to each other at least indirectly.

6. The modular system according to claim 1, wherein a deformation space is provided on either side of each of the plurality of battery modules in a transverse direction of the motor vehicle such that, while anchored to the underside of the motor vehicle via the mechanical interface, each of the plurality of battery modules are movable in the transverse direction before impacting an adjacent battery module during a side impact of the motor vehicle.

7. The modular system according to claim 1, wherein an underride protection is mounted to the underside of the motor vehicle beneath, in a height direction of the motor vehicle, the plurality of battery modules.

8. The modular system according to claim 7, wherein a deformation space is provided between the underride protection and the plurality of battery modules so that, during an impact of the motor vehicle, the underride protection is deformable before contacting any of the plurality of battery modules.

9. The modular system according to claim 1, wherein each of the plurality of battery cells are retained in the fluid-tight chamber of the modular housing by a holding frame which encloses the plurality of battery cells.

* * * * *